United States Patent
Song et al.

(10) Patent No.: US 12,347,622 B2
(45) Date of Patent: Jul. 1, 2025

(54) MULTILAYER ELECTRONIC COMPONENT WITH A COPPER-CONTAINING EXTERNAL ELECTRODE

(71) Applicant: SAMSUNG ELECTRO-MECHANICS CO., LTD., Suwon-si (KR)

(72) Inventors: Young Ah Song, Suwon-si (KR); Bong Gyu Choi, Suwon-si (KR); Kwang Dong Seong, Suwon-si (KR); Jae Hoon Bang, Suwon-si (KR); Do Kyeong Lee, Suwon-si (KR); Wan Sik Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 136 days.

(21) Appl. No.: 18/224,669

(22) Filed: Jul. 21, 2023

(65) Prior Publication Data
US 2024/0282529 A1    Aug. 22, 2024

(30) Foreign Application Priority Data
Feb. 21, 2023    (KR) ........................ 10-2023-0022772

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/30* (2013.01); *H01G 4/12* (2013.01)

(58) Field of Classification Search
None
See application file for complete search history.

(56) References Cited

U.S. PATENT DOCUMENTS

| | | | |
|---|---|---|---|
| 9,799,450 B2 * | 10/2017 | Oguni | H01G 4/30 |
| 2014/0049875 A1 * | 2/2014 | Kim | B22F 1/056 |
| | | | 75/346 |
| 2015/0014900 A1 | 1/2015 | Lee et al. | |
| 2017/0018362 A1 | 1/2017 | Nishisaka et al. | |
| 2018/0068788 A1 | 3/2018 | Kobayashi | |
| 2023/0207215 A1 | 6/2023 | Song et al. | |

FOREIGN PATENT DOCUMENTS

| | | | |
|---|---|---|---|
| JP | WO2016/186053 A1 | | 2/2018 |
| JP | 2022163228 A | * | 10/2022 |
| KR | 10-1444613 B1 | | 9/2014 |
| KR | 10-2017-0009724 A | | 1/2017 |
| KR | 10-2023-0097816 A | | 7/2023 |

* cited by examiner

*Primary Examiner* — Eric W Thomas
(74) *Attorney, Agent, or Firm* — Morgan, Lewis & Bockius LLP

(57) ABSTRACT

Provided is a multilayer electronic component, the multilayer electronic component including: a body including a dielectric layer and internal electrodes alternately disposed with the dielectric layer; an external electrode disposed on the body and connected to the internal electrodes, wherein the external electrode includes a metal including Cu, wherein the metal included in the external electrode has crystallites having a size of 70 nm or more and 100 nm or less, measured from a peak of a plane obtained from an X-ray diffraction pattern.

14 Claims, 4 Drawing Sheets

MULTILAYER ELECTRONIC COMPONENT WITH A COPPER-CONTAINING EXTERNAL ELECTRODE

CROSS-REFERENCE TO RELATED APPLICATION (S)

This application claims benefit of priority to Korean Patent Application No. 10-2023-0022772 filed on Feb. 21, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

Such a multilayer ceramic capacitor has a small size, implements high capacitance, and is easily mounted on a circuit board, and may thus be used as a component of various electronic devices. There has been increasing demand for a multilayer ceramic capacitor to have a reduced size and higher capacitance as each of various electronic devices such as a computer and a mobile device have a reduced size and higher output.

Recently, in order to improve capacitance per unit volume of multilayer ceramic capacitors, research on thinning external electrodes is being conducted. As one of the methods for thinning external electrodes, a method for forming external electrodes through a conductive paste to which fine metal powder is added, may be considered.

However, if fine metal powder is used when forming the external electrode, a sintering temperature of the electrode lowered and the external electrode is heat treated at a low temperature, so that a problem in which a size of crystallites of a metal included in the external electrode gradually decreases, may occur.

When the size of crystallites of the metal included in the external electrode decreases, the number of interfaces between the plurality of crystallites increases, thereby increasing internal stress and decreasing ductility. Accordingly, external impacts transmitted to the multilayer ceramic capacitor may not be effectively absorbed, and thus cracks may occur, which may adversely affect the reliability of the multilayer ceramic capacitor.

SUMMARY

An aspect of the present disclosure is to improve reliability of a multilayer electronic component by adjusting a size of crystallites of a metal included in an external electrode.

However, the object of the present invention is not limited to the above, and will be more easily understood in the process of describing specific embodiments of the present disclosure.

According to an aspect of the present disclosure, provided is a multilayer electronic component, the multilayer electronic component including: a body including a dielectric layer and internal electrodes alternately disposed with the dielectric layer; an external electrode disposed on the body and connected to the internal electrodes, wherein the external electrode includes a metal including Cu, wherein the metal included in the external electrode has crystallites having a size of 70 nm or more and 100 nm or less, measured from a peak of a (111) plane obtained from an X-ray diffraction pattern.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
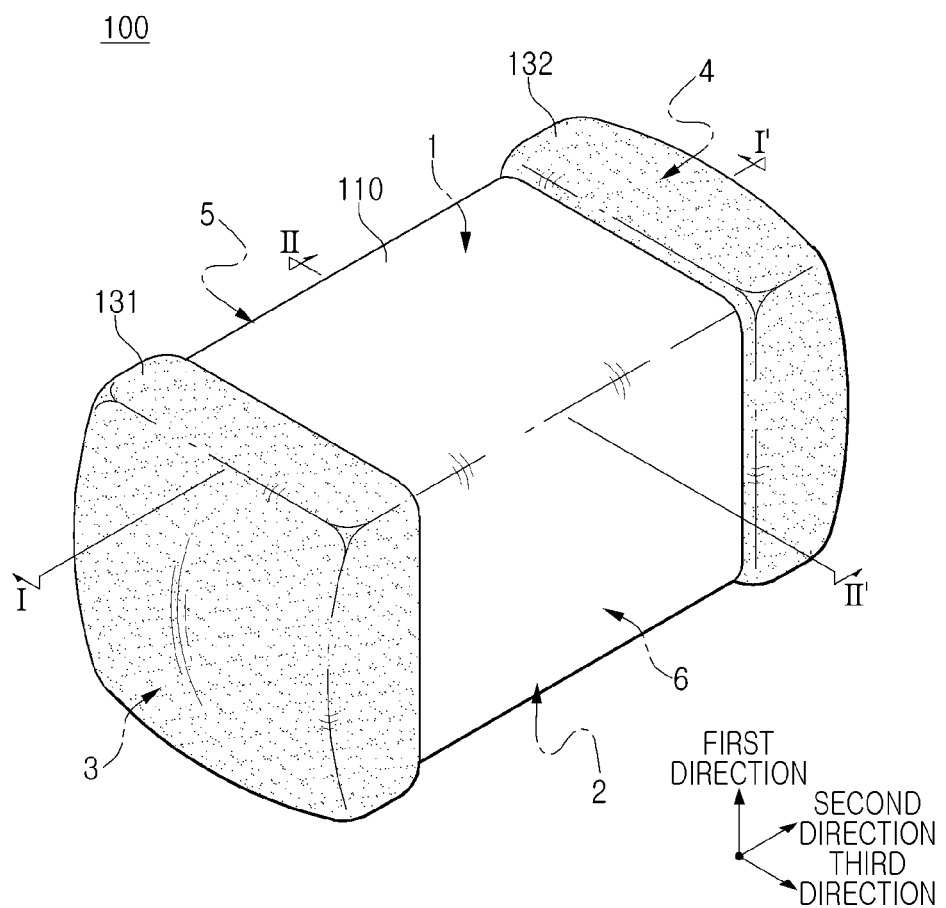
FIG. 1 is a perspective view schematically illustrating a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a thickness (T) direction, a second direction may refer to a length (L) direction, and a third direction may refer to a width (W) direction.

Multilayer Electronic Component

FIG. 1 is a perspective view schematically illustrating a multilayer electronic component according to an embodiment of the present disclosure.

Figure 2:
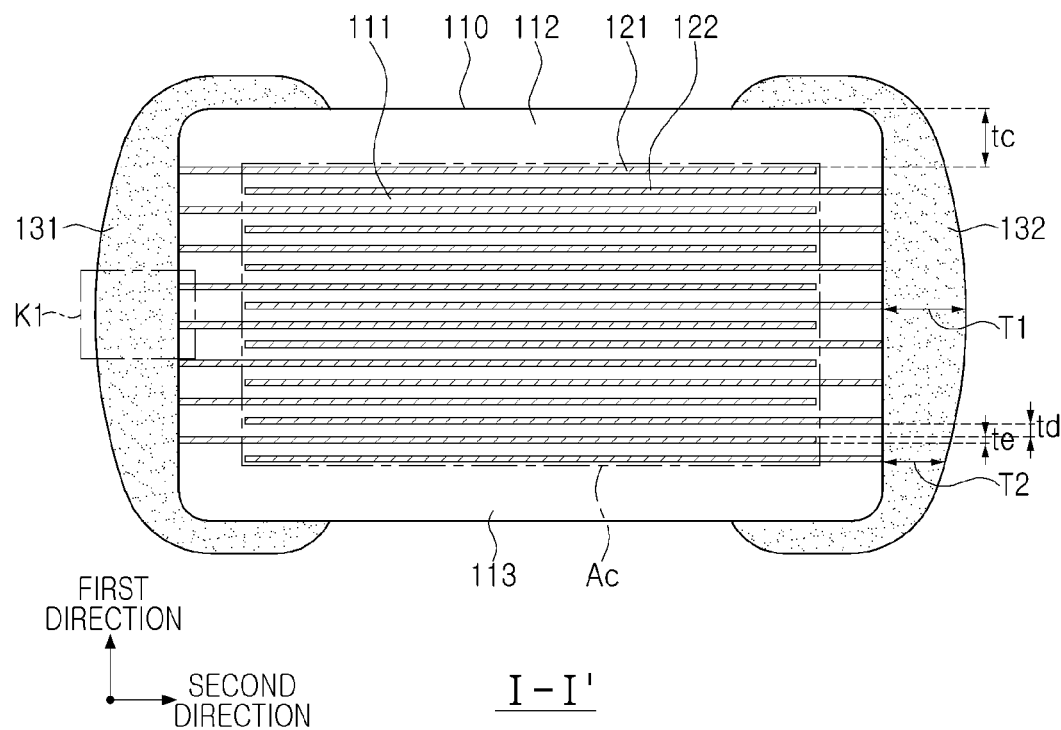
FIG. 2 is a cross-sectional view schematically illustrating a cross-section taken along line I-I' of FIG. 1.

FIG. 2 is a cross-sectional view schematically illustrating a cross-section taken along line I-I' of FIG. 1.

Figure 3:
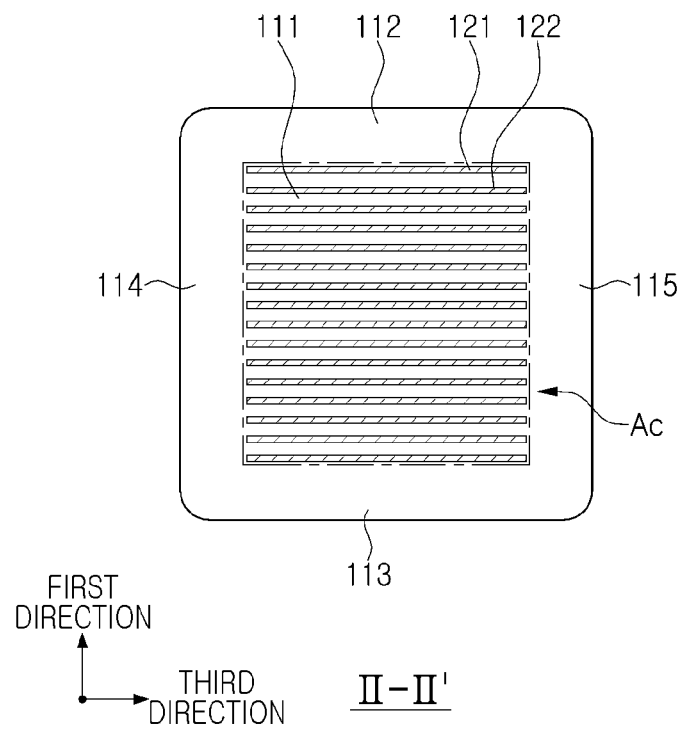
FIG. 3 is a cross-sectional view schematically illustrating a cross-section taken along line II-II' of FIG. 1.

FIG. 3 is a cross-sectional view schematically illustrating a cross-section taken along line II-II' of FIG. 1.

Figure 4:
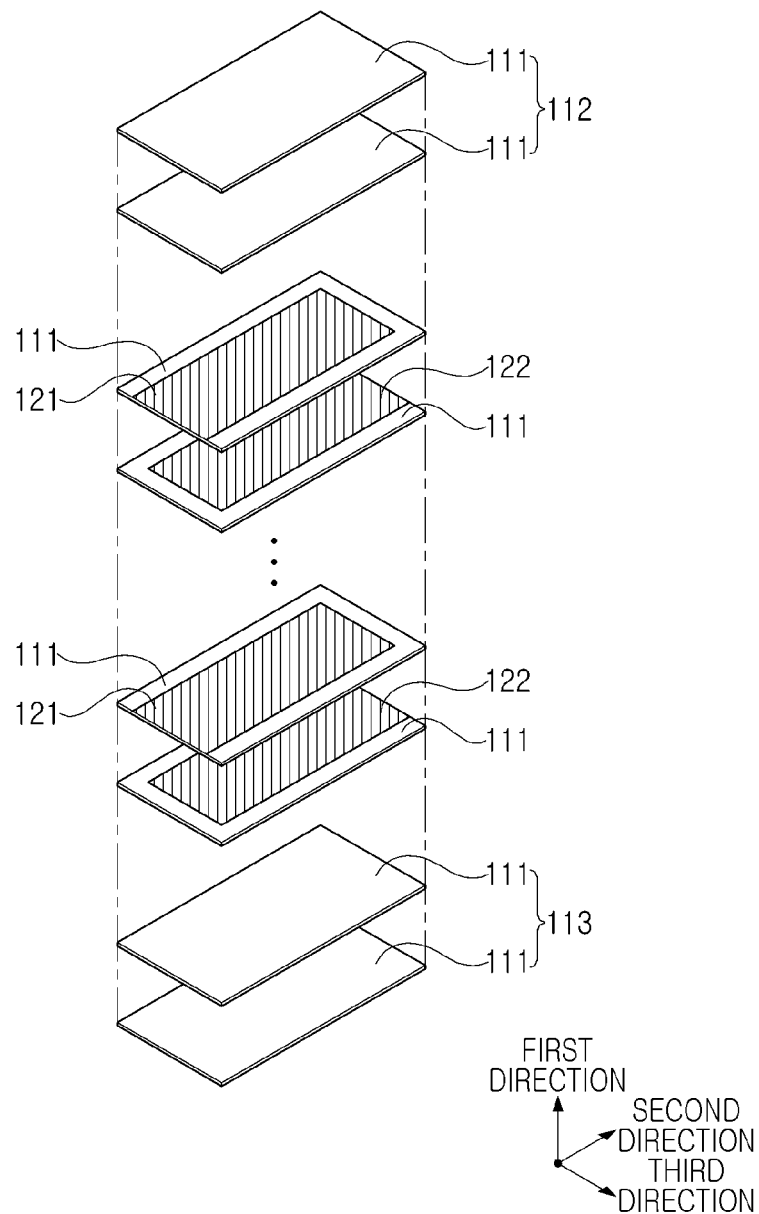
FIG. 4 is an exploded perspective view schematically illustrating an exploded body of a multilayer electronic component according to an embodiment of the present disclosure.

FIG. 4 is an exploded perspective view schematically illustrating an exploded body of a multilayer electronic component according to an embodiment of the present disclosure.

Figure 5:
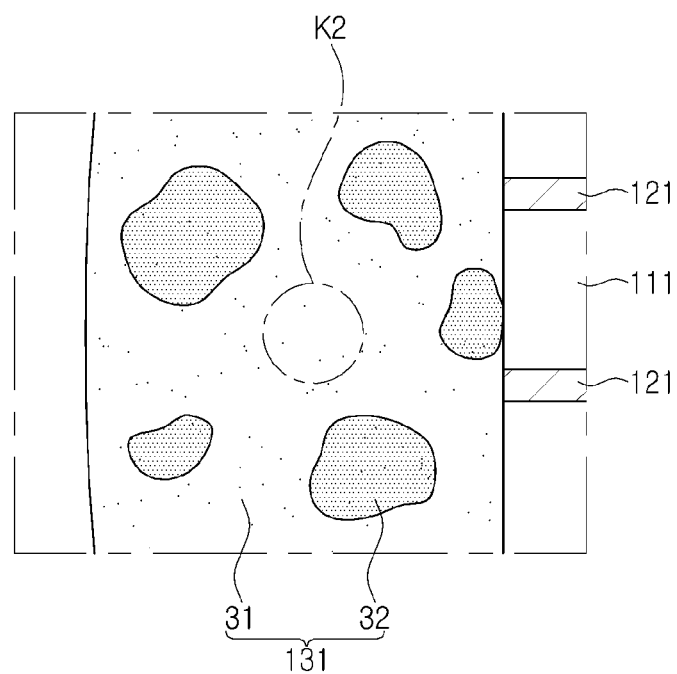
FIG. 5 is an enlarged view of a region K1 of FIG. 2.

FIG. 5 is an enlarged view of a region K1 of FIG. 2.

Figure 6:
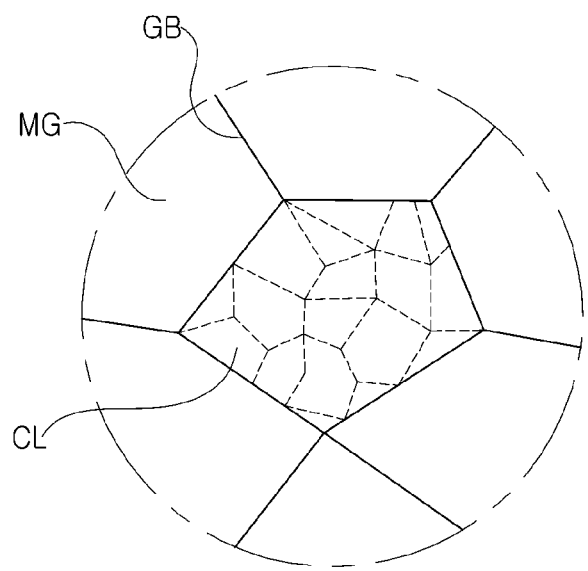
FIG. 6 is an enlarged view of a region K2 of FIG. 5.

FIG. 6 is an enlarged view of a region K2 of FIG. 5.

Hereinafter, a multilayer electronic component 100 according to an embodiment in the present disclosure will be described with reference to the drawings. In addition, a multi-layered ceramic capacitor (hereinafter referred to as 'MLCC') will be described as an example of a multilayer electronic component, but the present disclosure is not limited thereto, and it may also be applied to various multilayer electronic components such as an inductor and piezoelectric elements, varistors, thermistors, or the like.

According to an embodiment of the present disclosure, a multilayer electronic component 100 may include a body 110 including a dielectric layer 111 and internal electrodes 121 and 122 alternately disposed with the dielectric layer and external electrodes 131 and 132 disposed on the body and connected to the internal electrodes, wherein the external electrode includes a metal 31 including Cu, wherein the metal included in the external electrode may have crystallites having a size of 70 nm or more and 100 nm or less, measured from a peak of a (111) plane obtained from an X-ray diffraction pattern.

As described above, when the size of crystallites of the metal included in the external electrode is excessively reduced, internal stress remaining in the external electrode may increase and ductility may decrease. Accordingly, reliability of the multilayer electronic component may be adversely affected, such as generation of cracks due to failure to effectively absorb external impacts transmitted to the multilayer electronic component.

On the other hand, in the case of the multilayer electronic component 100 according to an embodiment of the present disclosure, the metal 31 included in the external electrodes 131 and 132 may have crystallites having a size of 70 nm or more and 100 nm or less, measured from a peak of a (111) plane obtained from an X-ray diffraction pattern, or the like may be effectively prevented, so that the reliability of the multilayer electronic component 100 may be improved.

Hereinafter, each component included in the multilayer electronic component 100 according to an embodiment of the present disclosure will be described in more detail.

The body 110 is not limited to a particular shape, and may have a hexahedral shape or a shape similar to the hexahedral shape, as illustrated in the drawings. The body 110 may not have a hexahedral shape having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

The body 110 may have a dielectric layer 111 and internal electrodes 121 and 122, alternately stacked therein. A plurality of dielectric layers 111 forming the body 110 may be in a sintered state, and adjacent dielectric layers 111 may be integrated with each other, such that boundaries therebetween may not be readily apparent without using a scanning electron microscope (SEM).

The dielectric layer 111 may be formed by preparing a ceramic slurry containing ceramic powder, an organic solvent and a binder, coating and drying the slurry on a carrier film to prepare a ceramic green sheet, and then sintering the ceramic green sheet. The ceramic powder is not particularly limited as long as sufficient capacitance may be obtained therewith, but, for example, barium titanate-based materials, lead composite perovskite-based materials, or strontium titanate-based materials may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, and the like.

An average thickness "td" of the dielectric layer 111 is not particularly limited. However, as the thickness of the dielectric layer 111 becomes thinner, cracks may easily occur in the body 110 due to stress generated when a voltage is applied, thereby causing a problem in that reliability of the multilayer electronic component is deteriorated. On the other hand, in the case of the multilayer electronic component according to an embodiment of the present disclosure, the metal 31 included in the external electrodes 131 and 132 has crystallites having a size of 70 nm or more and 100 nm or less, measured from a peak of a (111) plane obtained from an X-ray diffraction pattern, so that even when the average thickness "td" of the dielectric layer 111 is 0.4 μm or less, the reliability of the multilayer electronic component may be secured.

Here, the average thickness "td" of the dielectric layer 111 may refer to a size of the dielectric layer 111 disposed between the internal electrodes 121 and 122 in a first direction. The average thickness of the dielectric layer 111 may be measured by scanning a cross-section of the body 110 in first and second directions with a scanning electron microscope (SEM) at a magnification of 10,000. More specifically, an average value may be measured by measuring a thickness of one dielectric layer 111 at a plurality of points, for example, at 30 points equally spaced in a second direction. The 30 points having equal intervals may be designated in the capacitance formation portion Ac. In addition, if the average value is measured by extending the average value measurement to 10 dielectric layers, the average thickness of the dielectric layers can be more generalized.

The internal electrodes 121 and 122 may be alternately disposed, and for example, a first internal electrode 121 and a second internal electrode 122, which are a pair of electrodes having different polarities, may be disposed in the dielectric layer 111 having different polarities, may be disposed to face each other. That is, the first internal electrode 121 and the second internal electrode 122 may be electrically separated from each other by the dielectric layer 111 disposed therebetween.

The first internal electrode 121 may be disposed to be spaced apart from the fourth surface 4 and connected to the third surface 3. In addition, the second internal electrode 122 may be disposed to be spaced apart from the third surface 3 and connected to the fourth surface 4.

The conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti), and alloys thereof, and an embodiment of the present disclosure is not limited thereto.

The internal electrodes 121 and 122 may be formed by applying a conductive paste for internal electrodes containing a conductive metal to a predetermined thickness on a ceramic green sheet and sintering the same. A method of printing the conductive paste for the internal electrodes may be a screen printing method, a gravure printing method, or the like, but the present disclosure is not limited thereto.

An average thickness "te" of the internal electrodes 121 and 122 is not particularly limited. Meanwhile, as described above, in the case of the multilayer electronic component according to an embodiment of the present disclosure, the metal 31 included in the external electrodes 131 and 132 has crystallites having a size of 70 nm or more and 100 nm or less, measured from a peak of a (111) plane obtained from an X-ray diffraction pattern, so that even when the average thickness "te" of the internal electrodes 121 and 122 is 0.4 μm or less, the reliability of the multilayer electronic component may be secured.

The average thickness "te" of the internal electrodes 121 and 122 refers to a size of the internal electrodes 121 and 122 in a first direction. Here, the average thickness of the internal electrodes 121 and 122 may be measured by scanning a cross-section of the body 110 in first and second directions with a scanning electron microscope (SEM) at a magnification of 10,000. More specifically, an average value may be measured by measuring a thickness of one of the internal electrodes 121 and 122 at a plurality of points thereof, for example, at 30 equally spaced points in the second direction. The 30 equally spaced points may be designated in a capacitance formation portion (Ac) to be described later. In addition, if the average value is measured by extending the average value measurement to 10 internal electrodes 121 and 122, the average thickness of the internal electrodes can be more generalized.

The body 110 may include a capacitance formation portion Ac disposed in the body 110, and including first and second internal electrodes 121 and 122 alternately disposed with the dielectric layer 111 interposed therebetween and having capacitance formed therein, and a first cover portion 112 and a second cover portion 113 respectively disposed on both end surfaces of the capacitance formation portion Ac opposing each other in the first direction. The cover portions 112 and 113 may basically serve to prevent damage to the internal electrode due to physical or chemical stress. The cover portions 112 and 113 may have substantially the same structure as the dielectric layer 111, except for not including internal electrodes.

A thickness of the cover portions 112 and 113 is not particularly limited. However, an average thickness "tc" of the cover portions 112 and 113 may be 20 μm or less in order to achieve miniaturization and high capacitance of the multilayer electronic component. As described above, even when the average thickness "tc" of the cover portions 112 and 113 is 20 μm or less, the metal 31 included in the external electrodes 131 and 132 has crystallites having a size of 70 nm or more and 100 nm or less, measured from a peak of a (111) plane obtained from an X-ray diffraction pattern, so that the reliability of the multilayer electronic component may be secured. Here, the average thickness of the cover portions 112 and 113 refer to an average thickness of each of the first cover portion 112 and the second cover portion 113.

The average thickness of the cover portions 112 and 113 may refer to an average size of the cover portions 112 and 113 in a first direction, and may be a value obtained by averaging sizes of the cover portions 112 and 113 measured at five points having equal intervals in a cross-section of the body 110 in first and second directions.

The body 110 may include margin portions 114 and 115 disposed on both end surfaces of the capacitance formation portion Ac in a third direction. That is, the margin portions 114 and 115 may refer to a region between both ends of the internal electrodes 121 and 122 and a boundary of the body 110 in the cross-section of the body 110 cut in the third direction. In this case, the margin portions 114 and 115 may include a first margin portion 114 disposed on a side of the fifth surface 5 of the body 110 and a second margin portion 115 disposed on a side of the sixth surface 6 of the body 110.

The margin portions 114 and 115 may include the same material as the dielectric layer 111, except for not including the internal electrodes 121 and 122. The margin portions 114 and 115 may basically serve to prevent damage to the internal electrodes 121 and 122 due to physical or chemical stress.

The margin portions 114 and 115 may be formed by applying a conductive paste to the ceramic green sheet, except where margin portions are to be formed. Alternatively, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac facing each other in the third direction.

An average thickness of the margin portions 114 and 115 is not particularly limited. However, the average thickness of the margin portions 114 and 115 may be 20 μm or less in order to more easily achieve miniaturization and high capacitance of the multilayer electronic component. As described above, even when the average thickness of the margin portions 114 and 115 is 20 μm or less, the metal 31 included in the external electrodes 131 and 132 may have crystallites having a size of 70 nm or more and 100 nm or less, measured from a peak of a (111) plane obtained from an X-ray diffraction pattern, so that the reliability of the multilayer electronic component may be secured. Here, the average thickness of the margin portions 114 and 115 refers to an average thickness of each of the first margin portion 114 and the second margin portion 115.

The average thickness of the margin portions 114 and 115 may refer to an average size of the margin portions 114 and 115 in a third direction, and may be a value obtained by averaging sizes of the margin portions 114 and 115 measured at five points having equal intervals in the third direction in the cross-section of the body 110 in the first and third directions.

The external electrodes 131 and 132 may be disposed on the third surface 3 and the fourth surface 4 of the body 110, and may extend onto portions of the first, second, fifth, and sixth surfaces 1, 2, 5, and 6. In addition, the external electrodes 131 and 132 may include a first external electrode 131 connected to the first internal electrode 121 and a second external electrode 132 connected to the second internal electrode 122.

The external electrodes 131 and 132 may be formed by dipping the third and fourth surfaces 3 and 4 of the body 110 in a conductive paste for external electrodes including metal particles and glass, and then sintering the same.

Meanwhile, although not shown, a plating layer may be disposed on the external electrodes 131 and 132. The plating layer can improve mounting characteristics, and a type of the plating layer is not particularly limited. For example, the plating layer may be a plating layer including nickel (Ni), tin (Sn), and palladium (Pd) and/or alloys including the same, and may be formed of a plurality of layers. The plating layer may be, for example, a nickel (Ni) plating layer or a tin (Sn) plating layer, and may have a form in which the nickel (Ni) plating layer and tin (Sn) plating layer are sequentially formed. In addition, the plating layer may also include a plurality of nickel (Ni) plating layer and/or a plurality of tin (Sn) plating layers.

In the drawings, a structure in which the multilayer electronic component 100 has two external electrodes 131 and 132 is described, but an embodiment thereof is not limited thereto. However, the number and shape of the external electrodes 131 and 132 may be changed according to the shape of the internal electrodes 121 and 122 or other purposes.

Hereinafter, an external electrode will be described in more detail with reference to FIGS. 5 and 6. Meanwhile, although FIGS. 5 and 6 illustrate an enlarged portion of a first external electrode 131, there is only a difference in that the first external electrode 131 is connected to the first internal electrode 121, and the second external electrode 132 is connected to the second internal electrode 122, and the configurations of the first external electrode 131 and the second external electrode 132 are similar, so that the first external electrode 131 is mainly described hereinafter, which is considered to include a description of the second external electrode 132.

According to an embodiment of the present disclosure, the external electrode 131 may include metal 31 and glass 32. The metal 31 included in the external electrode 131 may include Cu, Ni, Pd, Pt, Au, Ag, Pb, and/or alloys including the same, and more preferably, may include Cu. The glass 32 included in the external electrode 131 may basically serve to improve bonding strength between the body 110 and the external electrode 131.

Meanwhile, referring to FIG. 6, the metal 31 included in the external electrode 131 may include a plurality of metal grains MG and a grain boundary GB disposed between the plurality of metal grains. In addition, at least one of the plurality of metal grains MG may include a plurality of crystallites CL. Here, a crystallite refers to a maximum aggregate of particles considered as a single crystal, and as illustrated, one metal grain MG may be composed of a plurality of crystallites CL.

A shape or average grain size of the metal grains MG may be determined, for example, by photographing a region in which the metal 31 is disposed among cross-sections of the external electrode 131 with a scanning electron microscope (SEM) or a transmission electron microscope (TEM). In addition, the size of the crystallites CL may be determined by a Scherrer equation based on, for example, a peak obtained from an X-ray diffraction pattern. Here, the Scherrer equation is expressed as $D=(K*\lambda)/(\beta*\cos\theta)$, where D is a size of crystallites, K is a Scherrer constant, $\lambda$ is a wavelength of X-rays, $\beta$ is a full width at half maximum (FWHM), and $\theta$ a position of the XRD peak, meaning half of $2\theta$.

According to an embodiment of the present disclosure, the metal 31 included in the external electrode 131 may have crystallites having a size of 70 nm or more and 100 nm or less, measured from a peak of a (111) plane obtained from an X-ray diffraction pattern. When the size of crystallites measured from the peak of the (111) plane is less than 70 nm, the size of crystallites is excessively small, so that internal stress remaining in the metal 31 included in the external electrode 131 may increase, ductility may be lowered so that external impacts transmitted to the multilayer electronic component 100 may not be effectively absorbed.

Meanwhile, as the size of crystallites measured from the peak of the (111) plane increases, the number of interfaces between the plurality of crystallites CL decreases, thereby reducing internal stress and improving ductility. Accordingly, reliability of the multilayer ceramic capacitor may be improved by effectively absorbing an external impacts transmitted to the multilayer ceramic capacitor to prevent cracks.

However, as the size of crystallites measured from the peak of the (111) plane increases excessively, a heat treatment is required at a higher temperature is required for sintering, and radiation cracks may occur in the body 110 due to such a high-temperature heat treatment. Therefore, when the metal 31 included in the external electrode 131 has crystallites having a size of 70 nm or more and 100 nm or less, measured from the peak of the (111) plane obtained from the X-ray diffraction patterns, the present inventors have confirmed that it is possible to reduce internal stress remaining in the external electrode 131, improve ductility, and prevent radiation cracks caused by the high-temperature heat treatment.

Here, the peak of the (111) plane obtained from the X-ray diffraction pattern may be derived from Cu included in the metal 31 of the external electrode 131. In addition, during XRD analysis of Cu, peaks of the (111), (200) and (220) planes may appear, but the reason for which the peak of the (111) plane was used to calculate the size of crystallites is that the intensity of the peak is relatively high compared to other planes, so information on the size of crystallites may be accurately obtained.

As described above, as the method of measuring the size of crystallites, the size of crystallites may be measured by analyzing the metal 31 included in the external electrode 131 by X-ray diffraction (XRD) to obtain an X-ray diffraction pattern, and then being calculated through a Scherrer Equation based on a peak of a (111) plane obtained from the X-ray diffraction pattern. The size of crystallites may be measured by analyzing a region in which the metal 31 is disposed, except for a region in which the glass 32 is disposed in a central region of the external electrode 131 in the first direction by XRD analysis, in a cross-section of the multilayer electronic component 100 in the first and second directions, cut from a center of the body 110 in the third direction, but the present disclosure is not limited thereto.

An average grain size of the plurality of metal grains MG is not particularly limited. However, the average grain size of the metal grains MG may generally increase as the size of the crystallites CL increases.

Meanwhile, in an embodiment, the average grain size of the plurality of metal grains MG may be 2 μm or more and 4 μm or less. When the average grain size of the plurality of metal grains MG is less than 2 μm, the number of grain boundaries GB increases, and a phenomenon in which the metal grains MG slip at the grain boundaries GB occurs, so that internal stress remaining in the external electrode 131 may increase. In addition, in order for the average grain size of the plurality of metal grains MG to exceed 4 μm, a heat treatment at a higher temperature is required, and there may be a problem in that radiation cracks may occur in the body 110 due to such a high-temperature heat treatment.

For example, in the cross-section of the multilayer electronic component 100 in the first and second directions, cut from the center of the body 110 in the third direction, the average grain size of the metal grains MG may be measured by obtaining an image captured by a scanning electron microscope (SEM) or a transmission electron microscope (TEM) of the region in which the metal 31 is disposed, except for the region in which the glass 32 is disposed in the central region of the external electrode 131 in the first direction, and then analyzing the image with an image analysis program.

Meanwhile, a method for adjusting the crystallite (CL) size of the metal 31 included in the external electrode 131 and the average grain size of the metal grain MG is not particularly limited. As a preferred example, the size of the crystallites CL of the metal 31 and the average grain size of the metal grains MG can be controlled by coating metal particles included in the conductive paste for external electrodes with $SiO_2$ and then sintering the same. That is, by forming the external electrode 131 with metal particles coated with $SiO_2$ for the external electrode, the metal 31 included in the external electrode 131 may include Si.

$SiO_2$ may serve to delay the sintering of the metal 31 included in the external electrode 131. That is, $SiO_2$ may serve to increase a sintering temperature of the metal 31 included in the external electrode 131, and accordingly, the size of crystallites CL and the average grain size of the metal grains MG of the metal 31 sintered at a higher sintering temperature may increase.

Meanwhile, $SiO_2$ coated on the metal particles may be expelled during the sintering process and move to the grain boundaries GB disposed between the plurality of metal grains MG. Accordingly, in an embodiment, the content of Si in the grain boundary GB may be greater than the content of Si in the metal grain MG.

The content of Si included in the grain boundary GB after sintering is not particularly limited. However, in an embodiment, the content of Si included in the grain boundary GB may be 0.3 at % to 1.25 at %. Here, the content of Si refers to the content of Si with respect to 100 at % of the total content of Cu, Ni, Si, and Al included in the grain boundary GB.

When the content of Si included in the grain boundary GB is less than 0.3 at %, the sintering delay effect described above may be insignificant. Meanwhile, as the content of Si included in the grain boundary GB increases, which may mean that the coating amount of $SiO_2$ coated on the metal particle increases. That is, as the content of Si included in the grain boundary GB increases, a sintering temperature of the metal 31 included in the external electrode 1331 may increase, and accordingly, as the content of Si included in the grain boundary GB increases, the crystallite (CL) size of the metal 31 included in the external electrode 131 and the average grain size of the metal grain MG may increase. However, when the sintering temperature of the metal 31 included in the external electrode 131 is excessively high because the content of Si included in the grain boundary GB is excessive, radiation cracks may occur in the body 110 due to excessive diffusion of the metal 31 included in the external electrode 131 into the internal electrode 121. Accordingly, it may be preferable that the content of Si included in the grain boundary GB is 1.25 at % or less.

In an embodiment, the metal 31 included in the external electrode 131 may include Al. The Al may serve to delay sintering of the metal 31 included in the external electrode 131, similar to Si described above. In an embodiment, the metal 31 included in the external electrode 131 may include Al. The Al may serve to delay sintering of the metal 31 included in the external electrode 131, similar to Si described above.

Meanwhile, when metal particles forming the external electrode 131 are coated with Si and Al, a Si—Al alloy may be formed on a surface of the metal particles, thereby making a sintering delay effect more remarkable, but the present disclosure is not limited thereto.

In an embodiment, the metal included in the external electrode 131 may further include at least one of Ni, Si, and Al, and respective contents of Cu, Ni, and Si with respect to 100 moles of a total content of Cu, Ni, Si, and Al included in the grain boundary GB is $C_{Cu}$, $C_{Ni}$, and $C_{Si}$, $C_{Cu}>C_{Ni}>C_{Si}$ may be satisfied. Here, Cu may be, for example, derived from metal particles included in the conductive paste for external electrodes, Ni may be, for example, diffused from metals included in the internal electrode 121 during a sintering process, and Si may be derived from, for example, $SiO_2$ coated on metal particles included in a conductive paste for external electrodes.

In an embodiment, when a size of the external electrodes 131 and 132 in the second direction measured from a central region of the body 110 in the first direction is T1, T1 may satisfy 5 μm or more and 20 μm or less. After cutting the multilayer electronic component 100 in the first and second directions based on the center of the body 110 in the third direction, T1 may be measured by observing the central region of the external electrodes 131 and 132 in the first direction with a scanning electron microscope (SEM). Here, the central region of the external electrodes 131 and 132 in the first direction may refer to a region disposed in a center among regions of the external electrodes 131 and 132, divided into 5 equal parts with respect to the first direction, in the scanned image of external electrodes 131 and 132 with a scanning electron microscope.

In an embodiment, when a size of the external electrodes 131 and 132 in the second direction measured from outermost internal electrodes 121 and 122 with respect to the first direction is T2, T2/T1 may be 0.8 equal to or greater than 0.8 and less than or equal to 1.0. An external electrode formed through a conventional dipping method tends to have a thick thickness in the central region in the first direction and a thin thickness on a corner of the body. That is, in the case of the conventional dipping method, as the thickness of the external electrode in the central region in the first direction increases, which may cause a problem in that capacitance per unit volume of the multilayer electronic component decreases, and the thickness of the external electrode on the corner of the body is reduced, which may cause a problem in that moisture resistance reliability of the multilayer electronic component decreases.

On the other hand, according to an embodiment of the present disclosure, since T2/T1 satisfies 0.8 or more and 1.0 or less, deterioration in the capacitance per unit volume of the multilayer electronic component or deterioration in the moisture resistance reliability due to a poor corner coverage can be prevented.

A method for controlling T2/T1 is not particularly limited. However, as described, when the metal particles included in the conductive paste for external electrodes are coated with $SiO_2$, shrinkage of the conductive paste for external electrodes during a sintering process can be suppressed due to a sintering delay effect, so that corner coverage may be increased and the thickness of the external electrode may be formed more uniformly.

T2 may be measured in the same cross-section as T1. That is, T2 may be measured by observing the cross-section of the multilayer electronic component 100 in the first and second directions with respect to the center of the body 110 in the third direction using a scanning electron microscope (SEM).

Example

<Measurement and Evaluation of Size of Crystallites>

First, a slurry containing barium titanate-based powder was applied to a carrier film and dried to prepare a plurality of ceramic green sheets. Thereafter, a conductive paste for internal electrodes was applied to the ceramic green sheets, the ceramic green sheets applied with the conductive paste for internal electrodes were stacked a plurality of times, and then sintered to form a body including a dielectric layer and internal electrodes.

Next, the third and fourth surfaces of the body were dipped in a conductive paste for external electrodes containing Cu particles and glass and then sintered to form an external electrode. In this case, before adding Cu particles to the conductive paste for external electrodes, the Cu particles were coated with $SiO_2$. In addition, the coating amount of the $SiO_2$ was adjusted differently for each sample chip.

Thereafter, after each sample chip was cut in first and second directions from a center of the body 110 in a third direction, a region in which the metal is disposed excluding a region in which the glass is disposed among central regions of the external electrode was analyzed by XRD. Next, based on a peak of a (111) plane obtained from an X-ray diffraction pattern through XRD measurement, crystallites having a size of each sample was measured through a Scherrer Equation and illustrated in Table 1 below. In this case, a Scherrer constant (K) was calculated as 0.9 and a wavelength ($\lambda$) of X-rays was calculated as 1.542 Å (CuKα). In addition, reliability evaluation was performed on each sample by applying a voltage of 1V for 2 hours at a temperature of 85° C. and relative humidity of 85%, and then each sample was observed with an optical microscope (OM) and whether or not cracks occur was determined and illustrated in Table 1 below.

TABLE 1

| Sample No. | Crystallite size (nm) | Crack evaluation |
|---|---|---|
| 1 | 62 | NG |
| 2 | 70 | OK |
| 3 | 82 | OK |
| 4 | 83 | OK |
| 5 | 98 | OK |
| 6 | 100 | OK |
| 7 | 120 | NG |

In Sample No. 1, an external electrode was formed with Cu particles not coated with $SiO_2$, and Sample Nos. 2 to 7 were coated with $SiO_2$ 1 to 5 parts by weight of $SiO_2$ with respect to 100 parts by weight of Cu particles.

Referring to Table 1, it can be seen that Sample No. 1 has crystallites having a size of less than 70 nm by forming an external electrode with Cu particles not coated with $SiO_2$. This is expected to result from the fact that =a size of crystallites of the metal included in the external electrode gradually decreased as the external electrode was sintered at a low temperature, and thus the number of interfaces between the plurality of crystallites increased, thereby increasing internal stress and decreasing ductility.

In addition, Sample No. 7 has crystallites having a size of more than 100 nm, which is expected that radiation cracks occurred in the body as the external electrode is sintered at such an excessively high sintering temperature due to an excessive coating amount of $SiO_2$.

On the other hand, in Sample Nos. 2 to 6, it was confirmed that the size of crystallites of the metal included in the external electrode was 70 nm to 100 nm, which was confirmed that no cracks occurred in the body. As a result, the size of crystallites of the metal included in the external electrode satisfies 70 nm or more and 100 nm or less, which was confirmed that the reliability of the multilayer electronic component can be improved.

<Moisture Resistance Reliability According to $SiO_2$ Coating Amount>

Moisture resistance reliability was evaluated according to the amount of $SiO_2$ coating. A sample chip was prepared in the same manner as described above, but in sample No. 8 in Table 2, Cu particles forming an external electrode was not coated with $SiO_2$, and in Sample No. 9, 2 parts by weight of $SiO_2$ with respect to 100 parts by weight of the Cu particles forming the external electrode was coated on the Cu particles.

For moisture resistance reliability evaluation, each sample chip was mounted, a voltage of 1 V was applied for 2 hours at a temperature of 85° C. and relative humidity of 85%, and then the number of samples whose insulation resistance fell 10-50 or less and were illustrated in Table 2 below.

TABLE 2

| Sample No. | $SiO_2$ content with respect to 100 parts by weight of Cu | Moisture resistance reliability |
|---|---|---|
| 8 | 0 | 4/40 |
| 9 | 2 | 1/40 |

Referring to Table 2, it can be confirmed that Sample No. 9 had superior moisture resistance reliability compared to Sample No. 8. This was expected because by coating the Cu particles forming the external electrode with $SiO_2$, it is possible to prevent cracks in the body by increasing the size of crystallites and to improve corner coverage through a sintering delay effect.

As set forth above, as one of various effects of the present disclosure, the reliability of the multilayer electronic component may be improved by adjusting size of crystallites of the metal included in the external electrode.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' used in this specification does not mean the same embodiment, and is provided to emphasize and describe different unique characteristics. However, an embodiment presented above is not excluded from being implemented in combination with features of another embodiment. For example, even if a matter described in one detailed embodiment is not described in another embodiment, it may be understood as a description related to another embodiment unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and internal electrodes alternately disposed with the dielectric layer;
an external electrode disposed on the body and connected to at least one of the internal electrodes,
wherein the external electrode includes a metal including Cu and Si,
wherein the metal included in the external electrode has crystallites having a size of 70 nm or more and 100 nm or less, measured from a peak of a plane obtained from an X-ray diffraction pattern.

2. The multilayer electronic component of claim 1, wherein the metal included in the external electrode comprises a plurality of metal grains and a grain boundary disposed between the plurality of metal grains.

3. The multilayer electronic component of claim 2, wherein at least one of the plurality of metal grains comprises a plurality of the crystallites.

4. The multilayer electronic component of claim 2, wherein an average grain size of the plurality of metal grains is 2 μm or more and 4 μm or less.

5. The multilayer electronic component of claim 2, wherein a content of Si at the grain boundary is greater than a content of Si inside a metal grain of the plurality of metal grains.

6. The multilayer electronic component of claim 5, wherein the content of Si at the grain boundary is 0.3 at % to 1.25 at %.

7. The multilayer electronic component of claim 2, wherein the metal included in the external electrode further comprises one or more of Ni, and Al,
wherein, respective contents of Cu, Ni, and Si with respect to 100 moles of a total content of Cu, Ni, Si, and Al included in the grain boundary are represented as $C_{Cu}$, $C_{Ni}$, and $C_{Si}$, $C_{Cu} > C_{Ni} > C_{Si}$ is satisfied.

8. The multilayer electronic component of claim 1, wherein the metal included in the external electrode further comprises Al.

9. The multilayer electronic component of claim 1, wherein the body comprises first and second surfaces opposing each other in a first direction, third and fourth surfaces connected to the first and second surfaces and opposing each other in a second direction, and fifth and sixth surfaces connected to the first to fourth surfaces and opposing each other in a third direction,
wherein the external electrode is disposed on the third and fourth surfaces,
wherein a size of the external electrode in the second direction measured from a central region of the body in the first direction is represented as T1, the T1 is 5 μm or more and 20 μm or less.

10. The multilayer electronic component of claim 9, wherein, a size of the external electrode in the second direction measured from an outermost internal electrode with respect to the first direction is represented as T2, T2/T1 is 0.8 or more and 1.0 or less.

11. The multilayer electronic component of claim 1, wherein the external electrode comprises glass.

12. A multilayer electronic component, comprising:
a body including a dielectric layer and internal electrodes alternately disposed with the dielectric layer;
an external electrode disposed on the body and connected to at least one of the internal electrodes,
wherein the external electrode includes a metal including a plurality of metal grains including Cu,
the metal further includes Si, a content of Si at a grain boundary disposed between the plurality of metal grains is 0.3 at % to 1.25 at %.

13. The multilayer electronic component of claim 12, wherein the metal has crystallites having a size of 70 nm or more and 100 nm or less, measured from a peak of a plane obtained from an X-ray diffraction pattern.

14. The multiplayer electronic component of claim 12, wherein the content of Si at the grain boundary is greater than a content of Si inside a metal grain of the plurality of metal grains.

* * * * *